US009286528B2

(12) United States Patent
Harding

(10) Patent No.: US 9,286,528 B2
(45) Date of Patent: Mar. 15, 2016

(54) MULTI-MODAL BIOMETRIC DATABASE SEARCHING METHODS

(71) Applicant: ImageWare Systems, Inc., San Diego, CA (US)

(72) Inventor: David Harding, Portland, OR (US)

(73) Assignee: ImageWare Systems, Inc., San Diego, CA (US)

(*) Notice: Subject to any disclaimer, the term of this patent is extended or adjusted under 35 U.S.C. 154(b) by 20 days.

(21) Appl. No.: 14/254,629

(22) Filed: Apr. 16, 2014

(65) Prior Publication Data

US 2014/0314283 A1     Oct. 23, 2014

Related U.S. Application Data

(60) Provisional application No. 61/812,589, filed on Apr. 16, 2013, provisional application No. 61/812,613, filed on Apr. 16, 2013.

(51) Int. Cl.
*G06K 9/00*     (2006.01)

(52) U.S. Cl.
CPC .............. *G06K 9/00892* (2013.01); *G06K 9/00* (2013.01)

(58) Field of Classification Search
CPC ............ G06K 9/00892; G06K 9/6255; G06K 9/00885; G06K 9/00; G06K 9/6202; G06K 2009/00939; G06K 9/00597; G06K 9/00006; G06K 9/6265; G06K 9/00093; G06K 9/6293; G06F 17/30244; G06F 21/32; G06F 17/30743; A61B 5/0452; G01N 21/314; G06Q 10/10; G06Q 20/40145; G06Q 50/22; G06Q 30/0269; G06Q 99/00; G06Q 20/405; G07F 7/1008; H04L 63/0861

USPC ............... 382/115, 116, 224; 707/723, 779; 600/301, 509, 529
See application file for complete search history.

(56) References Cited

U.S. PATENT DOCUMENTS

| 5,704,029 | A  | 12/1997 | Wright, Jr. |
| 5,963,136 | A  | 10/1999 | O'Brien |
| 6,014,427 | A  | 1/2000  | Hanson et al. |
| 6,095,985 | A  | 8/2000  | Raymond et al. |
| 6,112,049 | A  | 8/2000  | Sonnenfeld |
| 6,138,158 | A  | 10/2000 | Boyle et al. |
| 6,219,694 | B1 | 4/2001  | Lazaridis et al. |
| 6,256,666 | B1 | 7/2001  | Singhal |
| 6,298,231 | B1 | 10/2001 | Heinz |
| 6,333,973 | B1 | 12/2001 | Smith et al. |
| 6,463,462 | B1 | 10/2002 | Smith et al. |
| 6,463,464 | B1 | 10/2002 | Lazaridis et al. |
| 6,487,401 | B2 | 11/2002 | Suryanarayana et al. |
| 6,594,349 | B2 | 7/2003  | Fortman |

(Continued)

FOREIGN PATENT DOCUMENTS

| WO | 02/087267 A1 | 10/2002 |
| WO | 03/015430 A1 | 2/2003 |

*Primary Examiner* — Vu Le
*Assistant Examiner* — Aklilu Woldermariam
(74) *Attorney, Agent, or Firm* — San Diego IP Law Group LLP

(57) ABSTRACT

The present invention provides techniques for efficient searching of a multi-modal biometric database. Nested searching improves search efficiency by using the results of a previous biometric modality search to limit the search population for subsequent biometric searches. The method can also be used in combinations of non-biometric searches limiting subsequent biometric searches or vice versa.

17 Claims, 9 Drawing Sheets

(56) References Cited

U.S. PATENT DOCUMENTS

| | | |
|---|---|---|
| 6,610,105 B1 | 8/2003 | Martin, Jr. et al. |
| 6,631,400 B1 | 10/2003 | DiStefano, III |
| 6,721,578 B2 | 4/2004 | Minear et al. |
| 6,767,211 B2 | 7/2004 | Hall et al. |
| 6,769,009 B1 | 7/2004 | Reisman |
| 6,807,254 B1 | 10/2004 | Guedalia et al. |
| 6,826,614 B1 | 11/2004 | Hanmann et al. |
| 6,873,688 B1 | 3/2005 | Aarnio |
| 6,889,054 B2 | 5/2005 | Himmel et al. |
| 6,898,569 B1 | 5/2005 | Bansal et al. |
| 6,961,327 B2 | 11/2005 | Niu |
| 6,968,178 B2 | 11/2005 | Pradhan et al. |
| 6,978,118 B2 | 12/2005 | Vesikivi et al. |
| 6,987,945 B2 | 1/2006 | Corn et al. |
| 7,002,476 B2 | 2/2006 | Rapchak |
| 7,058,036 B1 | 6/2006 | Yu et al. |
| 7,076,244 B2 | 7/2006 | Lazaridis et al. |
| 7,113,977 B1 | 9/2006 | Baker et al. |
| 7,133,506 B1 | 11/2006 | Smith |
| 7,293,019 B2 | 11/2007 | Dumais et al. |
| 7,835,548 B1* | 11/2010 | Langley ............ G06K 9/00892 340/5.82 |
| 2001/0037264 A1 | 11/2001 | Husemann et al. |
| 2001/0047294 A1 | 11/2001 | Rothschild |
| 2001/0054108 A1 | 12/2001 | Lincoln et al. |
| 2002/0006793 A1 | 1/2002 | Kun-Szabo et al. |
| 2002/0006826 A1 | 1/2002 | Hansted |
| 2002/0015403 A1 | 2/2002 | McConnell et al. |
| 2002/0021696 A1 | 2/2002 | Minborg |
| 2002/0032595 A1 | 3/2002 | Hundscheidt et al. |
| 2002/0034292 A1 | 3/2002 | Tuoriniemi et al. |
| 2002/0052198 A1 | 5/2002 | Savilaakso |
| 2002/0052841 A1 | 5/2002 | Guthrie et al. |
| 2002/0054090 A1 | 5/2002 | Silva et al. |
| 2002/0055872 A1 | 5/2002 | LaBrie et al. |
| 2002/0057678 A1 | 5/2002 | Jiang et al. |
| 2002/0065097 A1 | 5/2002 | Brockenbrough et al. |
| 2002/0077076 A1 | 6/2002 | Suryanarayana et al. |
| 2002/0077080 A1 | 6/2002 | Greene |
| 2002/0077876 A1 | 6/2002 | O'Meara et al. |
| 2002/0083127 A1 | 6/2002 | Agrawal |
| 2002/0087596 A1 | 7/2002 | Lewontin |
| 2002/0087643 A1 | 7/2002 | Parsons et al. |
| 2002/0091797 A1 | 7/2002 | Wallenius et al. |
| 2002/0095465 A1 | 7/2002 | Banks et al. |
| 2002/0099544 A1 | 7/2002 | Levitt et al. |
| 2002/0099545 A1 | 7/2002 | Levitt et al. |
| 2002/0107002 A1 | 8/2002 | Duncan et al. |
| 2002/0107985 A1 | 8/2002 | Hwang et al. |
| 2002/0115456 A1 | 8/2002 | Narinen et al. |
| 2002/0119793 A1 | 8/2002 | Hronek et al. |
| 2002/0123335 A1 | 9/2002 | Luna et al. |
| 2002/0126708 A1 | 9/2002 | Skog et al. |
| 2002/0128001 A1 | 9/2002 | Shuttleworth |
| 2002/0137525 A1 | 9/2002 | Fleischer et al. |
| 2002/0141560 A1 | 10/2002 | Khayatan et al. |
| 2002/0142763 A1 | 10/2002 | Kolsky |
| 2002/0145043 A1 | 10/2002 | Challa et al. |
| 2002/0155848 A1 | 10/2002 | Suryanarayana |
| 2002/0159569 A1 | 10/2002 | Hasegawa |
| 2002/0169604 A1 | 11/2002 | Damiba et al. |
| 2002/0169605 A1 | 11/2002 | Damiba et al. |
| 2002/0169611 A1 | 11/2002 | Guerra et al. |
| 2002/0169613 A1 | 11/2002 | Damiba |
| 2002/0169614 A1 | 11/2002 | Fitzpatrick et al. |
| 2002/0173961 A1 | 11/2002 | Guerra |
| 2002/0174068 A1 | 11/2002 | Marsot |
| 2002/0174248 A1 | 11/2002 | Morriss |
| 2002/0174346 A1* | 11/2002 | Ting ................ G06F 21/32 713/186 |
| 2002/0176379 A1 | 11/2002 | Wallenius et al. |
| 2002/0184033 A1 | 12/2002 | Fitzpatrick et al. |
| 2002/0184391 A1 | 12/2002 | Phillips |
| 2002/0186845 A1 | 12/2002 | Dutta et al. |
| 2002/0187775 A1 | 12/2002 | Corrigan et al. |
| 2002/0188443 A1 | 12/2002 | Reddy et al. |
| 2002/0188451 A1 | 12/2002 | Guerra et al. |
| 2002/0188714 A1 | 12/2002 | Bouthors |
| 2002/0191795 A1 | 12/2002 | Wills |
| 2002/0193997 A1 | 12/2002 | Fitzpatrick et al. |
| 2002/0194331 A1 | 12/2002 | Lewis et al. |
| 2003/0003898 A1 | 1/2003 | Banerjee et al. |
| 2003/0006912 A1 | 1/2003 | Brescia |
| 2003/0013433 A1 | 1/2003 | alSafadi |
| 2003/0115152 A1 | 6/2003 | Flaherty |
| 2003/0135097 A1* | 7/2003 | Wiederhold ....... A61B 5/02055 600/301 |
| 2003/0142039 A1 | 7/2003 | Minear et al. |
| 2004/0034544 A1 | 2/2004 | Fields et al. |
| 2004/0133582 A1* | 7/2004 | Howard ............ G06K 9/00006 |
| 2004/0254836 A1 | 12/2004 | Emoke Barabas et al. |
| 2006/0031337 A1 | 2/2006 | Kim |
| 2006/0075019 A1 | 4/2006 | Donovan et al. |
| 2006/0104485 A1* | 5/2006 | Miller ................ G06K 9/00979 382/115 |
| 2006/0171571 A1* | 8/2006 | Chan ................ G06K 9/00885 382/115 |
| 2006/0179072 A1 | 8/2006 | Eves et al. |
| 2006/0240851 A1 | 10/2006 | Washburn |
| 2006/0256130 A1 | 11/2006 | Gonzalez |
| 2007/0100648 A1 | 5/2007 | Borquez et al. |
| 2008/0159598 A1* | 7/2008 | Iasso ................ G06K 9/00979 382/115 |
| 2008/0181465 A1* | 7/2008 | Sauerwein ......... G07C 9/00158 382/115 |
| 2009/0289760 A1* | 11/2009 | Murakami .......... G06K 9/6277 340/5.82 |
| 2010/0312763 A1* | 12/2010 | Peirce ................ G06K 9/00892 707/723 |
| 2011/0032076 A1* | 2/2011 | Rickman ............ G06K 9/00892 340/5.82 |
| 2011/0191329 A1* | 8/2011 | Petrov ............... G06F 17/30268 707/723 |
| 2011/0211735 A1* | 9/2011 | Langley ................ G06F 21/32 382/115 |
| 2012/0078886 A1* | 3/2012 | Dinerstein .......... G06K 9/6807 707/723 |

\* cited by examiner

500

| ID | Face Score | Iris Score | Finger Score |
|---|---|---|---|
| 25 | 95 | 97 | 98 |
| 104 | 91 | 20 | 10 |
| 53 | 86 | 88 | 12 |
| 98 | 83 | 12 | 53 |
| 120 | 82 | 50 | 19 |
| 13 | 79 | 87 | 90 |
| 48 | 77 | 81 | 70 |
| 29 | 73 | 80 | 55 |
| 154 | 73 | 30 | 63 |
| 88 | 71 | 25 | 10 |

FIG. 5

MULTI-MODAL BIOMETRIC DATABASE SEARCHING METHODS

CROSS-REFERENCE TO RELATED APPLICATIONS

The present application claims priority to U.S. Provisional Patent Application No. 61/812,589, filed on Apr. 16, 2013, and entitled "Nested Searching for Multi-Modal Biometric Database;" and U.S. Provisional Patent Application No. 61/812,613, filed on Apr. 16, 2013, and entitled "Searching Method for Multi-Modal Biometric Database," the disclosures of which are herein incorporated by reference in their entirety.

BACKGROUND OF THE INVENTION

1. Field of Invention

The present disclosure relates in general to biometric systems and more particularly, to searching techniques for multiple modalities in a biometric database.

2. Description of Related Art

Biometrics is the science of capturing and analyzing biological data such as, but not limited DNA, fingerprints, eye retinas and irises, voice patterns, facial patterns and hand measurements, for authentication and/or identification purposes. Authentication by biometric verification is becoming increasingly common in corporate and public security systems, consumer electronics and point of sale applications. Identification by biometric matching is increasingly important in law enforcement and national security.

A biometric engine comprises software and/or hardware that controls different components of a biometric system. The biometric engine controls the enrollment, capture, extraction, comparison and matching of biometric data from a user, i.e., client. The biometric engine provides authentication services to client applications and clients, where the identity of one or more clients can be verified or ascertained in a determined population using one or more biometric modalities, e.g., face, finger, retina, palm, voice, etc. A score or probability may be returned by the biometric engine to indicate successful or failed verification or identification without having to send personal information. U.S. Pat. Nos. 7,298,873; 7,362,884; 7,596,246; and 7,606,396; which are all incorporated by reference in their entireties, disclose exemplary biometric systems and biometric engines.

Biometric databases often contain millions of biometric data records. For example, the Integrated Automated Fingerprint Identification System (IAFIS) is a national automated fingerprint identification and criminal history system maintained by the Federal Bureau of Investigation (FBI). IAFIS is the largest biometric database in the world, housing the fingerprints and criminal histories of over 75 million subjects in the criminal master file, 39 million civil prints and fingerprints from 73,000 known and suspected terrorists processed by the U.S. or by international law enforcement agencies. On average, IAFIS receives over 160,000 tenprint fingerprint submissions per day. In large biometric databases, identification of a person needs to be determined in a fast and accurate way, and in real-time. Thus, a need exists for an effective, fast, and efficient technique of database searching in biometric databases.

SUMMARY OF THE INVENTION

The present invention provides search techniques for narrower and faster searching of biometric templates in a biometric database. In an embodiment of the invention, a first result set for a first biometric modality in a biometric database is identified, followed by at least a second biometric modality and using the results of the first biometric modality to limit the search scope of the second modality. Searching can also be limited using non-biometric data such as, but not limited to demographic data (e.g., sex, age, and/or any other demographic data) and/or geographic data (city, country, zip code, and/or any other geographic data).

In an embodiment of the invention, a multimodal biometric search method implemented on a biometric engine comprises the steps of: receiving, at a biometric engine, a first biometric probe of a first biometric modality and a second biometric probe of a second biometric modality; comparing the first biometric probe against a set of biometric templates of the first biometric modality; identifying a first subset of matching candidates from the set of biometric templates of the first biometric modality; comparing the second biometric probe against a set of biometric templates of the second biometric modality, wherein the set of biometric templates of the second biometric modality are limited to biometric templates of the second biometric modality associated with the identified first subset of matching candidates from the set of biometric templates of the first biometric modality; and identifying a second subset of matching candidates from the set of biometric templates of the second biometric modality. The method may further comprise the steps of: receiving, at the biometric engine, a third biometric probe of a third biometric modality; comparing the third biometric probe against a set of biometric templates of the third biometric modality, wherein the set of biometric templates of the third biometric modality are limited to biometric templates of the third biometric modality associated with the identified second subset of matching candidates from the set of biometric templates of the second biometric modality; and identifying a third subset of matching candidates from the set of biometric templates of the third biometric modality. The set of biometric templates of the first biometric modality are stored in a first template data cache. The set of biometric templates of the second biometric modality are stored in a second template data cache. The first biometric modality (e.g., fingerprint) is different than the second biometric modality (e.g., iris). The method may further comprise the step of determining the set of biometric templates of the first modality based on a demographic data search, wherein each of the set of biometric templates of the first modality is associated with demographic data. Additionally, the method may further comprise the step of determining the set of biometric templates of the first modality based on a geographic data search, wherein each of the set of biometric templates of the first modality is associated with geographic data. The step of identifying a first subset of matching candidates from the set of biometric templates of the first biometric modality comprises the step of generating a biometric score for each of the set of biometric templates of the first biometric modality and determining whether the biometric score exceeds a predetermined threshold score. The step of identifying a second subset of matching candidates from the set of biometric templates of the second biometric modality comprises the step of generating a biometric score for each of the set of biometric templates of the second biometric modality and determining whether the biometric score exceeds a predetermined threshold score.

The present invention also provides a parallel technique for searching a multi-modal biometric system. Here, biometric inputs (i.e., probes or captures) are acquired for a first and at least a second biometric modality. The first biometric input of a first biometric modality is searched in the biometric database to identify a first subset of the biometric database including one or more matches to the first biometric input. The at least second biometric input of an at least second biometric modality is searched in the biometric database to identify at least second subset of the biometric database including one or more matches to the at least second biometric input. A list is returned of potential biometric matches based on the combination of the first and at least second subset by taking an intersection or union of the at least two subsets.

In another embodiment of the invention, a multimodal biometric search method implemented on a biometric engine comprises the steps of: receiving, at a biometric engine, a first biometric probe of a first biometric modality, a second biometric probe of a second biometric modality, and a third biometric probe of a third biometric modality; comparing the first biometric probe against a set of biometric templates of the first biometric modality; identifying a first subset of matching candidates from the set of biometric templates of the first biometric modality; comparing the second biometric probe against a set of biometric templates of the second biometric modality, wherein the set of biometric templates of the second biometric modality are associated with the set of biometric templates of the first biometric modality; identifying a second subset of matching candidates from the set of biometric templates of the second biometric modality; comparing the third biometric probe against a set of biometric templates of the third biometric modality, wherein the set of biometric templates of the third biometric modality are associated with the set of biometric templates of the first biometric modality; identifying a third subset of matching candidates from the set of biometric templates of the third biometric modality; and identifying a unified set of matching candidates by joining the first subset, second subject, and third subset of matching candidates at intersection points. The steps of identifying a first subset of matching candidates from the set of biometric templates of the first biometric modality, identifying a second subset of matching candidates from the set of biometric templates of the second biometric modality, and identifying a third subset of matching candidates from the set of biometric templates of the third biometric modality are performed in parallel. The method may further comprise storing the set of biometric templates of the first biometric modality in a first template data cache, storing the set of biometric templates of the second biometric modality in a second template data cache, and storing the set of biometric templates of the third biometric modality in a third template data cache. The first, second, and third biometric modalities are different. The method may further comprise determining the set of biometric templates of the first modality based on a demographic data search, wherein each of the set of biometric templates of the first modality is associated with demographic data and/or determining the set of biometric templates of the first modality based on a geographic data search, wherein each of the set of biometric templates of the first modality is associated with geographic data. The step of identifying a first subset of matching candidates from the set of biometric templates of the first biometric modality comprises the step of generating a biometric score for each of the set of biometric templates of the first biometric modality and determining whether the biometric score exceeds a predetermined threshold score. The step of identifying a second subset of matching candidates from the set of biometric templates of the second biometric modality comprises the step of generating a biometric score for each of the set of biometric templates of the second biometric modality and determining whether the biometric score exceeds a predetermined threshold score. The step of identifying a third subset of matching candidates from the set of biometric templates of the third biometric modality comprises the step of generating a biometric score for each of the set of biometric templates of the third biometric modality and determining whether the biometric score exceeds a predetermined threshold score.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 5 illustrates a final result set according to an exemplary embodiment of the invention;

DETAILED DESCRIPTION OF EMBODIMENTS

Figure 1:
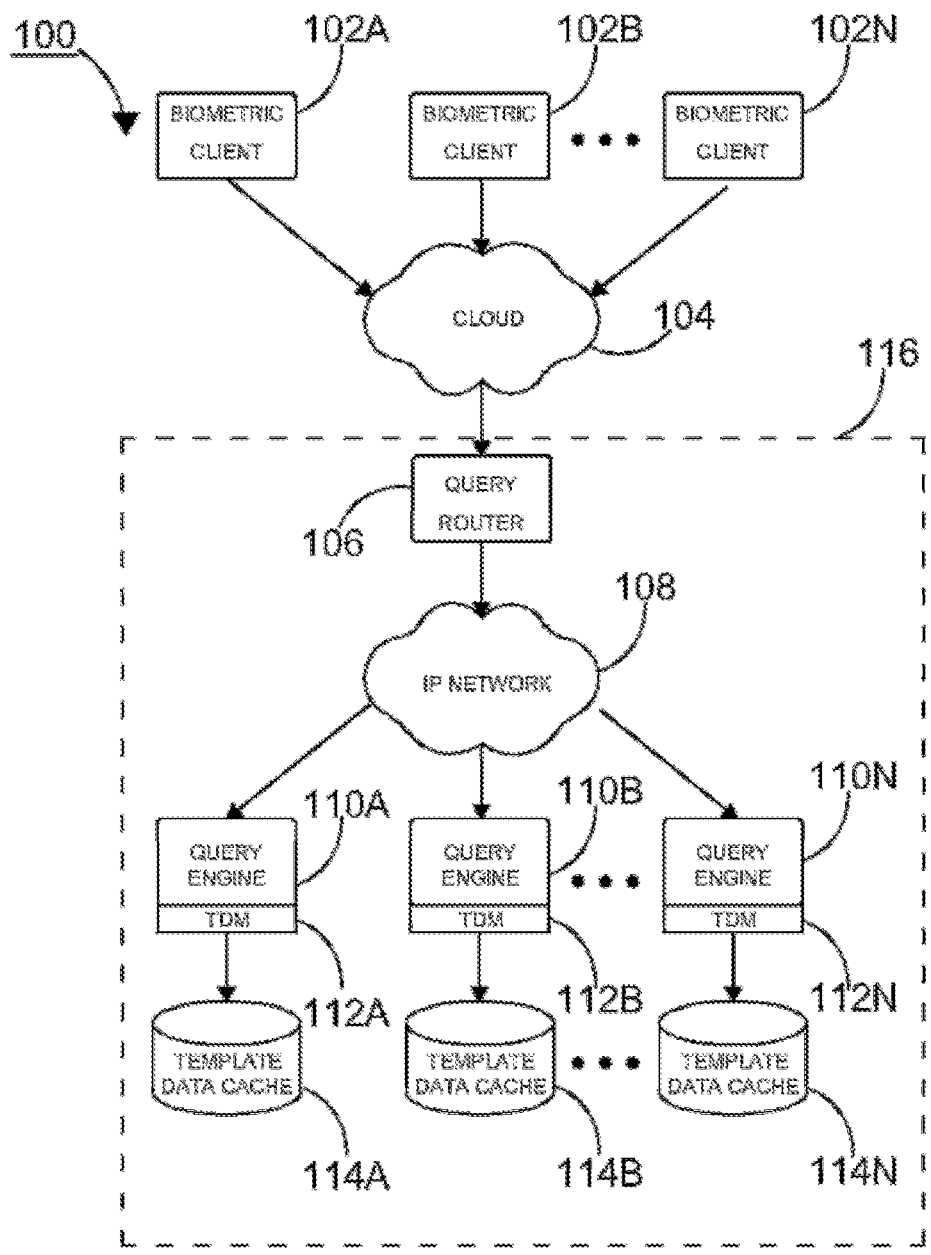
FIG. 1 illustrates a multimodal biometric system according to an embodiment of the invention.

Preferred embodiments of the present invention and their advantages may be understood by referring to FIGS. 1-9, wherein like reference numerals refer to like elements. The descriptions and features disclosed herein can be applied to various interactive messaging systems, the identification and implementation of which are apparent to one of ordinary skill in the art. The features described herein are broadly applicable to any type of communications technologies and standards.

As used herein, the following terms have the following definitions:

"Query engine" refers to a system capable of, among other things, comparing biometric templates and returning a biometric score or a biometric fusion score.

"Query router" refers to a device or system that may manage and queue queries in a query engine.

"Biometric fusion score" is any probability score that multiple biometric enrollments of one or more biometric modalities match multiple biometric probes of the same modalities. The scores of each modality are normalized and combined (i.e., fused) to create a single probability score.

"Result set" refers to data returned from a query.

"Biometric data" refers to data that is used to verify or identify a person based on physical traits or behaviors. Examples of biometric data include, but are not limited to digital representations of fingerprints, faces, irises, and other machine-readable data generated by biometric algorithms that are used for biometric enrollment, identity verification, and/or identification.

"Biometric capture" refers to the act of using a biometric input device or system to capture a biometric probe in the form of images, templates, or other form.

"Biometric score (or match score)" refers to a probability score that a given biometric enrollment and a given biometric probe represent the same identity.

"Biometric template" is a piece of binary data generated by a biometric algorithm that is used to compare one biometric against another.

"Metadata" refers to non-biometric data associated with each of the plurality of biometric templates stored in template data cache. Metadata can be used to filter biometric templates that match at least one non-biometric data.

The present invention provides, among other things, a method for nested searching in a multi-modal biometric system. The method includes identifying a first result set for a first biometric modality in a biometric database, followed by the identification of at least a second biometric modality and using the results of the first biometric modality to limit the search scope of the second modality. Searching can also be limited using non-biometric data such as, but not limited to demographic data (e.g., sex, age, and/or any other demographic data) and/or geographic data (city, country, zip code, and/or any other geographic data). A nested search provides a narrower and faster searching process of templates in a biometric database.

FIG. 1 illustrates a multimodal biometric system 100 according to an embodiment of the invention. Multimodal biometric system 100 comprises one or more biometric clients 102A-N, a network 104, and a biometric engine 116. The biometric engine 116 comprises a query router 106, a network 108, and one or more query engines 110A-N associated with corresponding template data caches 114A-N. The networks 104 and 108 can be any types of telecommunications network (whether the same or different) such as, but not including the Internet or ("Cloud") or a private internet protocol network (or any combination thereof) that allows the biometric clients 102A-N and query engines 110A-N to exchange data with the query router 106. Identification and implementation of networks 104 and 108 is readily appreciated to one of ordinary skill in the art.

The biometric clients 102A-N include computing devices having installed thereon a suitable operating system and a biometric capturing device, the identification and implementation of which is apparent to one of ordinary skill in the art. The biometric clients 102A-N capture one or more biometric probes that may be employed for identity authentication in the real-time biometric system 100.

The biometric clients 102A-N are in communication with the query router 106 via the network 104, which can be accessed through any type of communications protocol such as, but not limited to cellular 3G, cellular 4G, Wi-Fi, WiMax, or landline broadband, among others, the implementation of which are readily apparent to one of ordinary skill in the art. The query router 106 comprises a computer having installed thereon a suitable operating system and biometric software programmed according to the embodiments described herein.

Each query engine 110A-N includes at least one computing device, such as for example a desktop computer, server, or array of computers, each computing device having disk storage, memory, and optionally, processing capabilities, the implementation of all of which are apparent to one of ordinary skill in the art. Each query engine 110A-N includes a respective template data manager software module, herein referred to as TDM 112A-N, which manages template data caches 114 where biometric templates are stored and retrieved. Optionally, TDM 112A-N may operate as a separate module of query engines 110A-N. TDM 112A-N may also manage multiple threads to support multiple simultaneous searches and enrollments. The template data manager 112A-N are described in further detail in copending and commonly assigned U.S. patent application Ser. No. 14/254,472, filed on Apr. 16, 2014, and entitled "Real-Time Biometric Database and Template Management," the disclosure of which is incorporated by reference in its entirety.

In an embodiment of the invention, each query engine 110A-N is associated with one or more template data caches 114, which can be allocated in disk or memory of query engine 110. Each template data cache 114 is operable to store a plurality of biometric templates and associated with a specific type of biometric modality such as fingerprint, iris, or face, among others. In addition, one or more memory maps (not shown) are created in primary memory of query engine 110, where each memory map is associated with one or more template data caches 114. A memory map includes a plurality of biometric templates at any given time, with corresponding primary memory addresses associated with biometric templates copied from template data caches 114.

Figure 2:
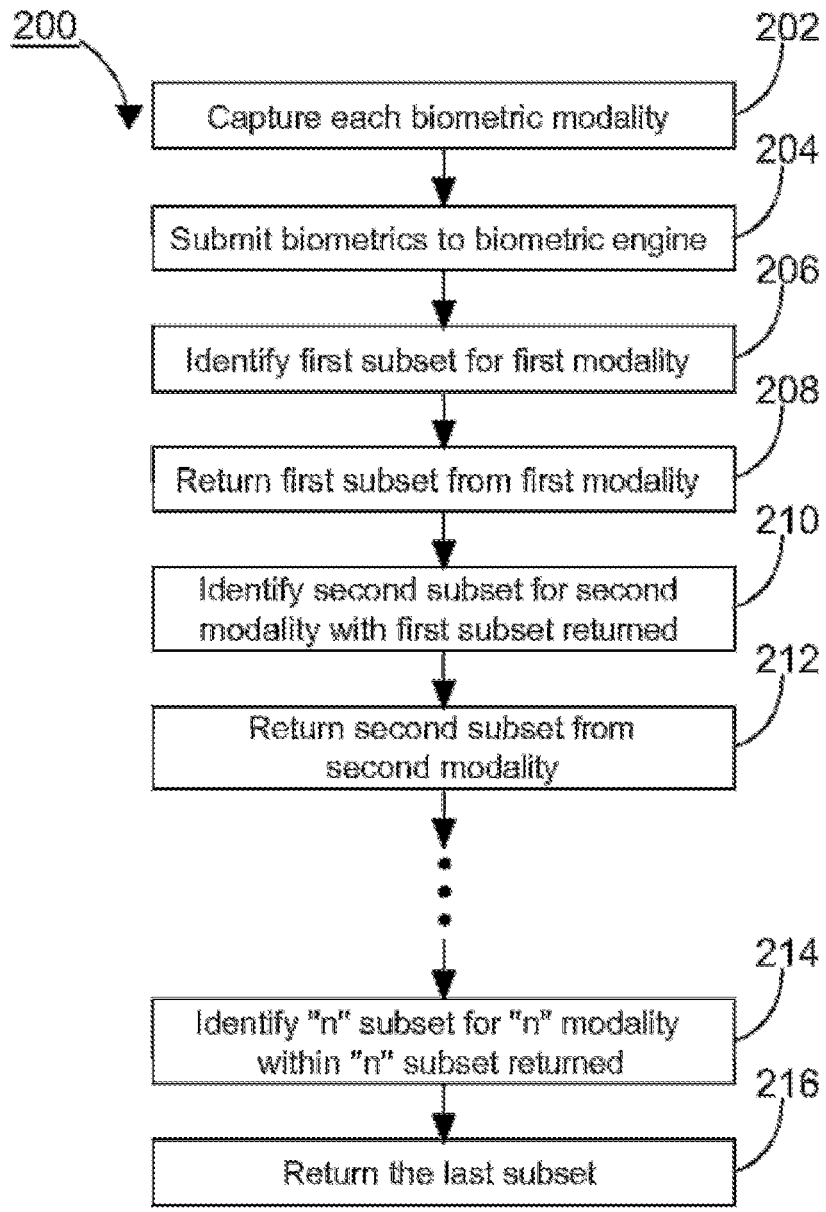
FIG. 2 illustrates a method for nested searching according to an embodiment of the invention.

FIG. 2 illustrates a method for nested searching 200 according to an embodiment of the invention. The method 200 is implemented in multimodal biometric system 100. The method 200 starts by capturing (step 202) each biometric modality for a first and at least a second biometric modality to compare in a multimodal biometric database. Following the process, biometric captures are submitted (step 204) to biometric engine 116 to search within a defined order of modality search. The comparison methodology for each biometric modality may be pre-established and configured in the biometric engine 116.

Following the process, identification (step 206) of a first subset for the first modality is performed. For example, the first subset is identified by comparing each of the submitted biometric probes for the first modality against biometric templates of that modality stored in the biometric database, e.g., template data cache 114, to generate a probability score. Whenever a comparison matches or exceeds a predetermined threshold score, the record is added to the first result set. Subsequently, the first result set from first modality is returned (step 208) in order to continue with the search.

The process 200 continues by identifying (step 210) a second subset for a second modality within the returned first result set. Identification of the second subset is performed by comparing each of the submitted biometric probes for the second modality only against biometric templates of that modality associated with the first result set. Subsequently, the second result set from second modality is returned (step 212).

The process repeats with every single biometric capture, until no more biometric captures are available. Assuming there are a number "n" of modalities, then, identification (step 214) of the "nth" subset for within the "n−1" subset is returned. Subsequently, the last result set or "nth" is returned (step 216), representing a list of potential biometric matches in the nested search.

In an embodiment of the invention, the method of nested searching 200 also combines biometric searches with non-biometric metadata searches. In this modified process, one or more non-biometric characteristics of a person to be identified or verified are identified, followed by developing an index based on the identified one or more non-biometric characteristics. Using non-biometric metadata identifies records to be biometrically searched in the biometric database, by querying the database for records matching the developed index. For example, a first level search is done using fingerprints and a second level search is done using geographic data to narrow the results to a certain country, state, city, zip code and/or any other geographic data. Non-biometric metadata includes, but is not limited to geographic data, demographic data and/or any metadata related to the biometric data.

In another embodiment of the invention, the method of nested searching 200 retains each result set obtained and forwards it into a subsequent result set. In this embodiment, a first step includes retaining the biometric matching results (e.g., probabilities or scores) for each record contained in the first result set (at step 208) of the biometric database, for example by associating the matching results with the second result set (at step 212) or by saving the biometric scoring results (e.g., in memory or a temporary file). Subsequently, the biometric matching results (e.g. probabilities or scores) are retained for each record contained in the second result set of the biometric database, for example by associating the matching results with a subsequent result sets or by saving the biometric scoring results (e.g., in memory or a temporary file). The process may continue for "n" number of modalities within the "n" subset. A final step includes returning the biometric matching results in a single merged result set.

Figure 3:
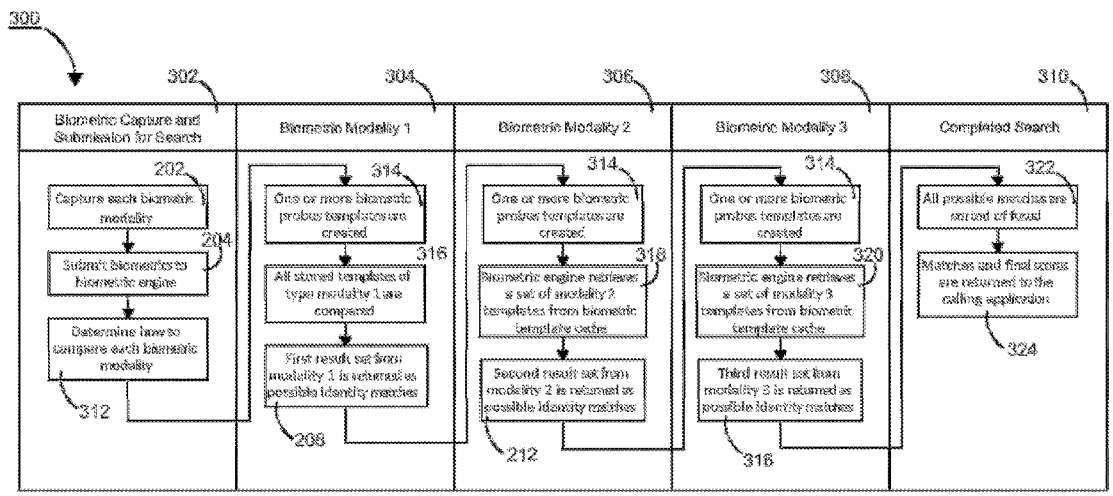
FIG. 3 illustrates a method of nested searching according to an embodiment of the invention.

FIG. 3 illustrates a method of nested searching 300 according to an embodiment of the invention. Here, the method 300 is displayed via a swim lane diagram comprising lanes: biometric capture and submission for search 302, biometric modality one 304, biometric modality two 306, biometric modality three 308, and completed search 310. The use of three biometric modalities is exemplary only. One of ordinary skill in the art appreciates that any number of biometric modalities may be implemented. For example, additional or less modalities may exist.

Biometric capture and submission for search 302 begins by capturing (step 202) each biometric modality. The biometric captures, i.e., data, are submitted (step 204) to the biometric engine 116 for search within a defined order of modality search. Biometric engine is preconfigured to determine how to compare (step 312) each biometric modality in a requested order. In another embodiment of the invention, the user or administrator defines the order of modality search.

Subsequently, the search process for biometric modality one 304 begins, where one or more biometric probe templates are created (step 314) using biometric capture for modality one. The biometric probe templates may include 2D face, 3D face, iris, retina, finger vein, palm vein, single fingerprint, fingerprints, scans of the flat of a palm, writers palm, hand geometry, dental records, signature, voice, nuclear DNA, mitochondrial DNA, keystroke, gait, smell, and/or any other biometric feature that can be digitally analyzed.

Continuing the process, all stored templates of type modality one in template data cache 114 are compared (step 316) against the captured biometric probe(s). Query router 106 directs the query to the appropriate query engine 110 for processing depending on the biometric modality. Subsequently, biometric templates in template data cache 114 are compared against the submitted probe(s), resulting in a biometric score for certain templates that meets or exceeds a threshold score. This biometric score along with associated identity is saved (step 208) in the first result set. This first result set from modality one represents possible identity matches. The first result set is returned to the query router 106.

After first result set from modality one is obtained, biometric modality two 306 begins the second search, where one or more biometric probe templates may be created (step 314) using biometric capture for modality two. The biometric probe templates may include 2D face, 3D face, iris, retina, finger vein, palm vein, single fingerprint, fingerprints, scans of the flat of a palm, writers palm, hand geometry, dental records, signature, voice, nuclear DNA, mitochondrial DNA, keystroke, gait, smell, and/or any other biometric feature that can be digitally analyzed. The query router 106 then directs the query to the appropriate query engine 110 for processing depending on the biometric modality.

Continuing the process, the biometric engine retrieves (step 318) a set of modality two biometric templates from template data cache 114, which are limited only to templates of modality two associated with the identities found in first result set. Subsequently, all templates of modality two may be compared against the captured biometric probe(s) for that modality. Whenever a comparison matches or exceeds a predetermined score, the record may be added (step 212) to the second result set. The second result set from modality two is returned and passed to biometric modality three 308 as possible identity matches.

After the second result set from modality two is obtained, biometric modality three 308 begins the process for the third search, where one or more biometric probe templates are created (step 314) using biometric capture for modality three. Biometric probe templates may include 2D face, 3D face, iris, retina, finger vein, palm vein, single fingerprint, fingerprints, scans of the flat of a palm, writers palm, hand geometry, dental records, signature, voice, nuclear DNA, mitochondrial DNA, keystroke, gait, smell, and/or any other biometric feature that can be digitally analyzed. The query router 106 may then direct the query to the appropriate query engine 110 for processing depending on the biometric modality.

Continuing the process, the biometric engine retrieves (step 320) a set of modality three biometric templates from template data cache 114, which are limited only to templates of modality three associated with the identities found in the second result set 212. Subsequently, all templates of modality three are compared against the captured biometric probe(s) for that modality. Whenever a comparison matches or exceeds a predetermined threshold score, the record is added (step 216) to the last result set. The last result set from modality three is returned and passed to completed search 310 module as possible identity matches.

After the last result set is obtained, all possible matches are sorted (step 322) by modality, weight, score or all scores may be fused for each possible identity match and sorted by highest probability, known as biometric fusion score. Finally, matches and final scores are returned (step 324) to query router 106 and to the calling application, respectively.

Figure 4:
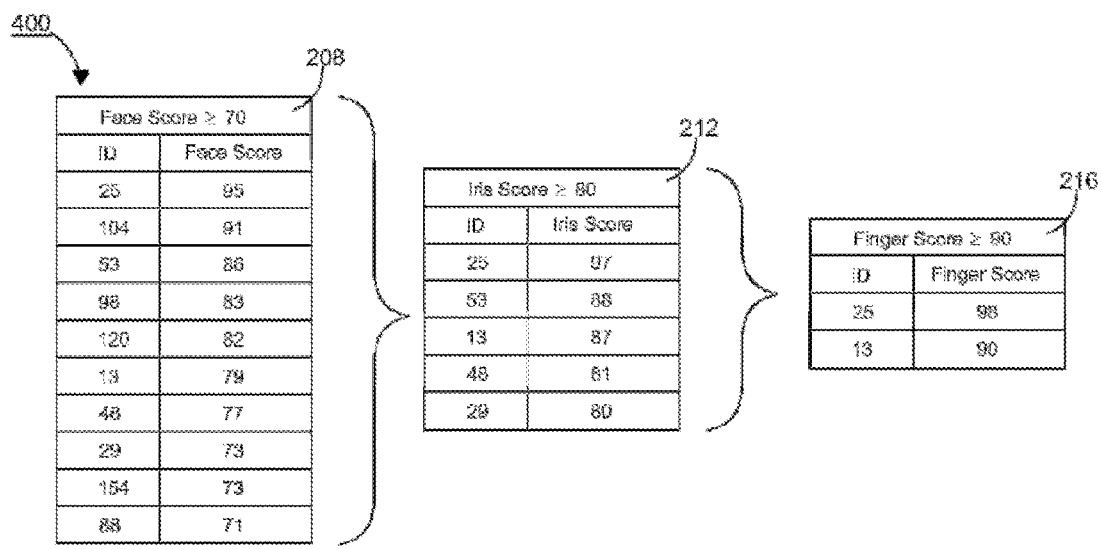
FIG. 4 illustrates three result sets obtained using the method of nested searching of FIG. 2 accordingly to an exemplary embodiment of the invention.

FIG. 4 illustrates three result sets 400 obtained using the method of nested searching 200 according to an exemplary embodiment of the invention. Here, the three modalities used are face, iris, and finger. First result set 208, second result set 212, and third or last result set 216 are shown, respectively. However, the method of nested searching 200 may include any number of modalities and may be performed in any order of modalities.

In this example, the first result set 208 is obtained by comparing the first biometric input modality against biometric templates in template data cache 114 of the same modality. As shown, first result set 208 contains ten records. However, first result set 208 may contain any number of records as long as the query conditions are met. In this example, the first modality to be compared is face and a minimum score of seventy (70) is the threshold score to include a record in first result set 208.

The second result set 212 is obtained by comparing the second biometric input modality against templates of the same modality associated with the identities returned in first result set 208. In this example, second result set 212 contains five records. However, second result set 212 may contain any number of records as long as the query conditions are met. In this example, the second modality to be compared is iris and a minimum score of eighty (80) is the threshold score to include a record in second result set 212. The iris modality is only compared to iris templates associated with the ten identities returned in first result set 208.

Last result set 216 is obtained by comparing the third biometric input modality against templates of the same modality associated with the identities returned in second result set 212. As shown, last result set 216 contains two records. However, last result set 216 may contain any number of records as long as the query conditions are met. The third modality to be compared is finger and a minimum score of ninety (90) is the threshold score to include a record in last result set 216. Finger modality is only compared with finger templates associated with the 5 identities returned in second result set 212.

FIG. 5 illustrates a final result set 500 according to an exemplary embodiment of the invention. As in FIG. 4, three modalities are included: face, iris and finger. First result set 208 is stored in memory and merged with second result set 212. Further on, the merge between first result set 208 and second result set 212 is merged with last result set 216. The final result set 500 comprises first result set 208, second result 212, and last result set 216.

In another exemplary use of the present invention, an unknown person requires authentication against a biometric database. A first biometric modality for the person is captured and compared against templates of the same modality stored in a biometric database to return a first result set 208 that contains two results. A second level of nested search is applied using demographic/non-biometric data such as sex. A second result set 212 is returned containing a single result that verifies the identity of the person.

The present invention also provides a parallel technique for searching a multi-modal biometric system. Here, biometric inputs (i.e., probes or captures) are acquired for a first and at least a second biometric modality. The first biometric input of a first biometric modality is searched in the biometric database to identify a first subset of the biometric database including one or more matches to the first biometric input. The at least second biometric input of an at least second biometric modality is searched in the biometric database to identify at least second subset of the biometric database including one or more matches to the at least second biometric input. A list is returned of potential biometric matches based on the combination of the first and at least second subset by taking an intersection or union of the at least two subsets.

Figure 6:
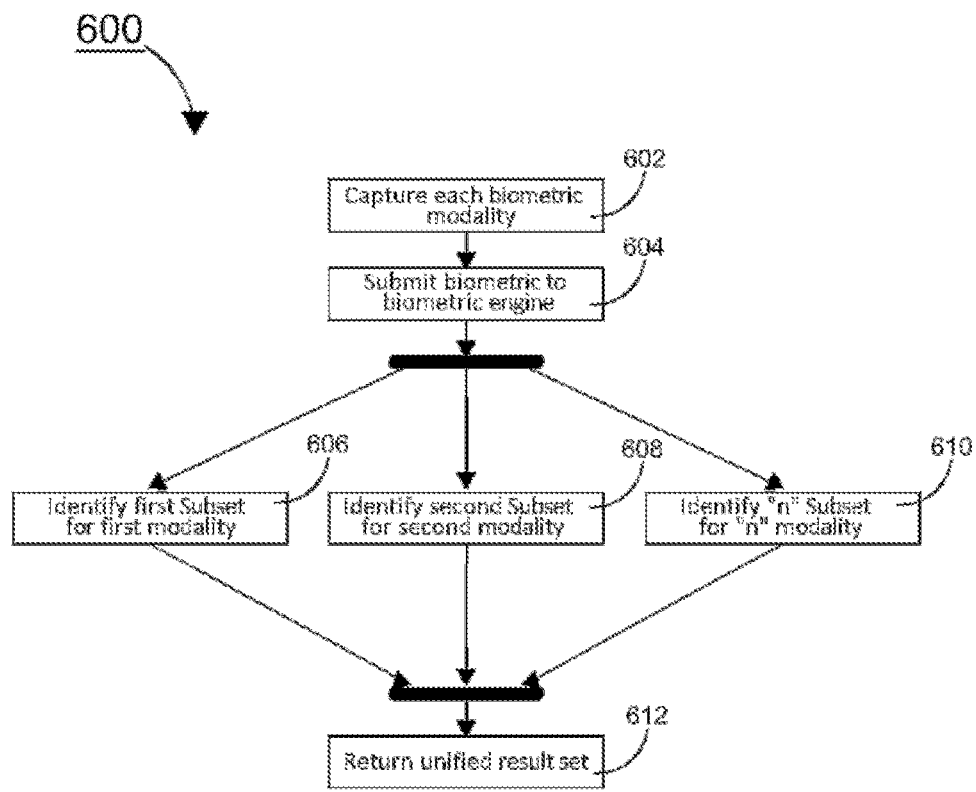
FIG. 6 illustrates a method of biometric searching according to an embodiment of the invention.

FIG. 6 illustrates a method of biometric searching 600 according to an embodiment of the invention. The method is implemented in multimodal biometric system 100. The method starts by capturing (step 602) each biometric modality for a first and at least a second biometric modality to compare in a multimodal biometric database. Capturing each biometric modality is done using biometric capture devices in biometric clients 102. The biometric captures are submitted (step 604) to biometric engine for matching. The comparison methodology for each biometric modality is pre-established and configured in multimodal biometric system 100.

Continuing the process, a first subset for first modality is identified (step 606). Identification of a first subset is performed by comparing each of the submitted biometric probes for the first modality against biometric templates of that modality stored in template data caches 114 to generate a probability score for each template. Whenever a comparison matches or exceeds a predetermined threshold score, the record is added to a result set for the first modality. In an embodiment of the invention, the result set is a list of "n" number of records with the highest scores. In parallel, identification of a second subset for a second modality is performed (step 608). Identification of the second subset is performed by comparing each of the submitted biometric probes for the second modality against biometric templates of that modality stored in the biometric database to generate a probability score for each template. Whenever a comparison matches or exceeds a predetermined threshold score, the record is added to a result set for the second modality. In an embodiment of the invention, the result sets for each modality may be a list of "n" number of records with the highest scores. The process also identifies (step 610) "n" number of subsets for each of an "n" number of modalities in parallel.

After all modalities have been matched, a unified result set is returned (step 612). The unified result set is formed by joining all the result sets together at their intersection points (e.g., record identification number, unique identifiers, etc.), meaning that if a record exists in all the result sets for each modality, that particular record is added to the unified result set. The unified result set represents a list of potential biometric matches in the biometric search. In another embodiment of the invention, the method of biometric search 600 is also used to exclude individuals from the unified result set, in which case, all other records except the ones that exist in all the result sets for each modality are deleted from the unified result set.

In an embodiment of the invention, the method of biometric searching 600 combines biometric searches with non-biometric metadata searches. In this process, a first step includes the identification of one or more non-biometric characteristics of a person to be identified or verified, followed by developing an index based on the identified one or more non-biometric characteristics. The index is associated with biometric templates stored in template data cache 114 depending on non-biometric traits associated with that biometric template. For example, a biometric template is associated with an index pertaining to a geographic location such as a city or country from where the individual associated with that biometric template lives. Finally, the method of biometric searching 200 using non-biometric metadata identifies records to be biometrically searched in the biometric database, by querying the database for records matching the developed index. For example, a first level search is performed using geographic data to narrow the results to a certain country, state, city, zip code, and/or any other geographic data and a second level search may be done using fingerprints, iris and face. Non-biometric metadata includes geographic data, demographic data, and/or any metadata related to the biometric data.

The conditions or thresholds for each modality matching may be the same or may be vary for each modality.

Figure 7:
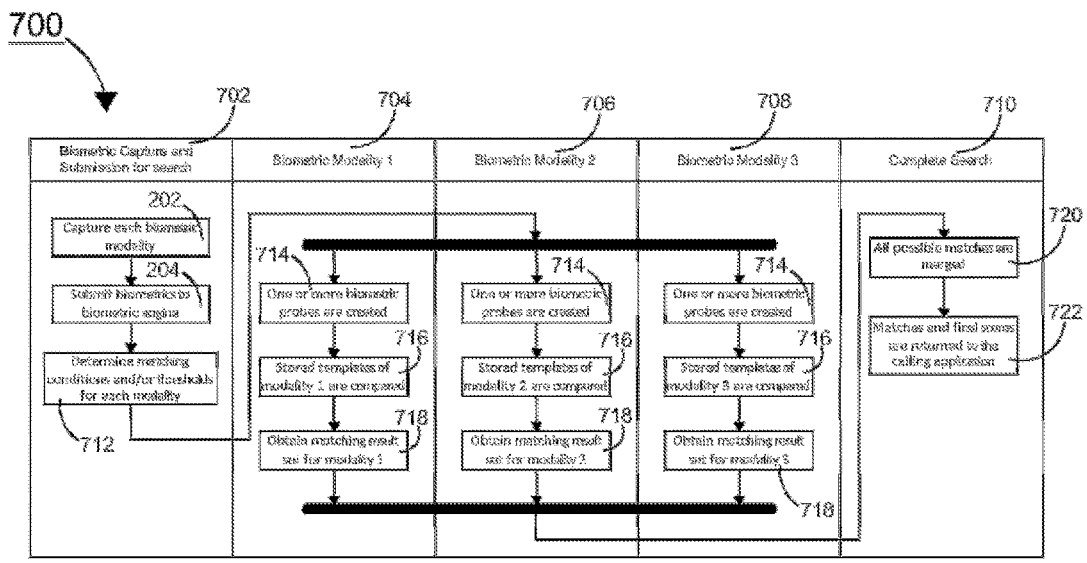
FIG. 7 illustrates a method of biometric searching according to an embodiment of the invention.

FIG. 7 illustrates a method of biometric searching 700 according to an embodiment of the invention. Here, the method 700 is displayed via a swim lane diagram comprising lanes: biometric capture and submission for search 702, biometric modality one 704, biometric modality two 706, biometric modality three 708, and completed search 710. The biometric capture and submission for search 702 begins by capturing (step 202) each biometric modality. In this exemplary embodiment of the invention, three biometric modalities are used. In other embodiments of the invention, additional or less modalities may be employed. Continuing the process, biometric captures are submitted (step 204) to the biometric engine for searching. The biometric engine 116 is pre-configured to determine how to compare 312 each biometric modality.

Subsequently, the search process for biometric modality one 704, biometric modality two 706 and biometric modality three 708 are performed (in parallel), where one or more biometric probe templates may be created (step 714) using biometric capture devices for each modality type. Biometric probe templates may include 2D face, 3D face, iris, retina, finger vein, palm vein, single fingerprint, fingerprints, scans of the flat of a palm, writers palm, hand geometry, dental records, signature, voice, nuclear DNA, mitochondrial DNA, keystroke, gait, smell and/or any other biometric feature that can be digitally analyzed.

Continuing the process, all templates are compared (step 716) against the captured probe(s) for each modality in template data cache 114, resulting in a biometric score for each template. Query router 106 directs the query to the appropriate query engine 110 for processing depending on the biometric modality. If the biometric score meets a certain condition such as a threshold, the score along with associated identity is saved (step 718) in a result set for that modality. The result set is returned to query router 106.

After all modalities are processed, all possible matches are merged (step 720) into a single subset at their intersection points. Finally, matches and final scores are returned (step 722) to query router 106 and to the calling application respectively.

Figure 8:
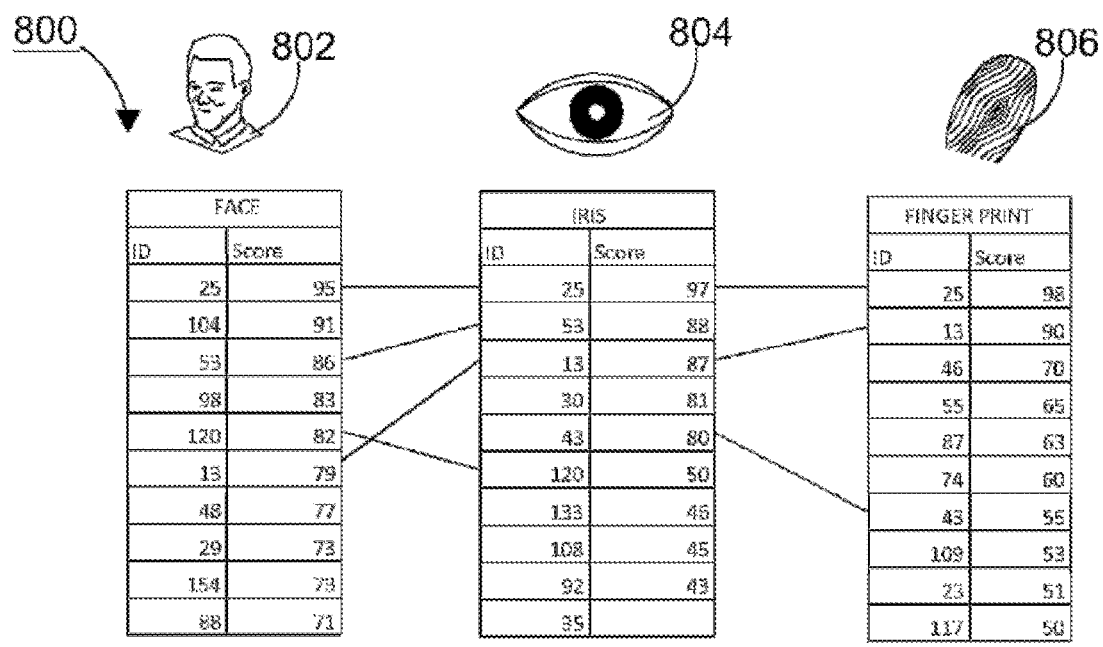
FIG. 8 illustrates three result sets obtained for three different modalities in an exemplary embodiment of the invention.

FIG. 8 illustrates three result sets 800 obtained for three different modalities in an exemplary embodiment of the invention. Here, the three result sets 800 are obtained via the method of biometric search 600 before being merged into a single result set. As shown, a first modality is face 802 and the corresponding result set includes the ten records that scored the highest in the matching process for facial recognition. The second modality is iris 804 and the corresponding result set includes the ten records that scored highest in the matching process for iris recognition. The third modality is fingerprint and its corresponding result set also includes the ten records that scored highest in the matching process for fingerprint. One of ordinary skill in the art recognizes that any number and types of modalities may be used—the use of face, iris, and fingerprint is exemplary only.

Each record may contain a field that uniquely identifies an individual and their related biometrics (e.g., a unique identification number).

Figure 9:
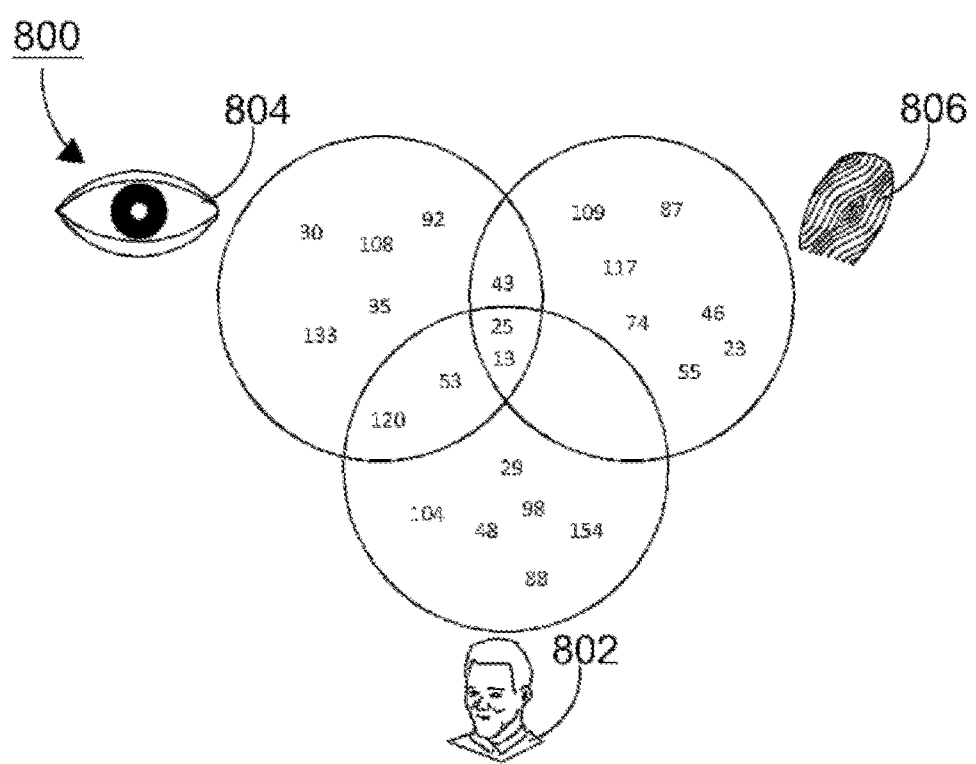
FIG. 9 illustrates an intersection diagram showing the result sets of FIG. 8.

FIG. 9 illustrates an intersection diagram showing the result sets of FIG. 8. The only records that intersect on all three result sets 800 are ID record 25 and ID record 13, therefore both records are merged into a unified result set 612 as illustrated in the following table.

Referring again to FIG. 8, a multimodal biometric search includes three result sets 800 obtained using the method of biometric searching 200, namely face, iris and finger. A first result set is obtained by comparing the first biometric input modality against biometric templates in template data cache 114 of the same modality. In this example, the first result set contains ten records. The result set may contain any number of records as long as the query conditions are met. In this example, the first modality to be compared is face 802 and the top ten records are included in the result set. A second result set is obtained by comparing the second biometric input modality against templates of the same modality. In this example, the second modality to be compared is iris 804 and the top ten records are included in the result set. The iris 804 modality is only compared with iris 404 templates stored in template data caches 114. A third result set is obtained by comparing the third biometric input modality against templates of the same modality. In this example, the second modality to be compared is fingerprint 806 and the top ten records are included in the result set. The finger print 806 modality is only compared with fingerprint 806 templates stored in template data caches 114.

Unified result set 612 is obtained by combining the result sets for all the biometric modalities previously compared at their intersection points.

As another example, an unknown person may require authentication against a biometric database. A first biometric modality for the person is captured and compared against templates of the same modality stored in template data caches 114 to return a first result set that contains two records, with unique identifier numbers of 10 and 15, respectively. The biometric threshold for the first modality is set to return records that score greater than 90. A second biometric modality for the person is captured and compared against templates of that modality stored in a template data cache 114 to return a second result set that contains a single record, with a unique identifier number of 15. The biometric threshold for the second modality is set to return records that score greater than 95. The result sets for both modalities are combined into a unified result set 212 using their intersection points. The unified result set 612 returns the record with ID 15 because it is the only record contained on both of the individual result sets for both modalities.

One of ordinary skill in the art appreciates that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein, and those provided in the accompanying documents, can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein.

I claim:

1. A multimodal biometric search method implemented on a biometric engine and comprising the steps of:
    receiving, at a biometric engine, a first biometric probe of a first biometric modality and a second biometric probe of a second biometric modality, wherein the first biometric modality is any biometric feature that can be digitally analyzed, and the second biometric modality is different from the first biometric modality;
    comparing the first biometric probe against a set of biometric templates of the first biometric modality;
    identifying a first subset of matching candidates from the set of biometric templates of the first biometric modality;
    comparing the second biometric probe against a set of biometric templates of the second biometric modality, wherein the set of biometric templates of the second biometric modality are limited to biometric templates of the second biometric modality associated with the identified first subset of matching candidates from the set of biometric templates of the first biometric modality; and
    identifying a second subset of matching candidates from the set of biometric templates of the second biometric modality.

2. A multimodal biometric search method implemented on a biometric engine and comprising the steps of:
    receiving, at a biometric engine, a first biometric probe of a first biometric modality and a second biometric probe of a second biometric modality, wherein the first biometric modality is any biometric feature that can be digitally analyzed, and the second biometric modality is different from the first biometric modality;
    comparing the first biometric probe against a set of biometric templates of the first biometric modality;
    identifying a first subset of matching candidates from the set of biometric templates of the first biometric modality;
    comparing the second biometric probe against a set of biometric templates of the second biometric modality, wherein the set of biometric templates of the second biometric modality are limited to biometric templates of the second biometric modality associated with the identified first subset of matching candidates from the set of biometric templates of the first biometric modality;
    identifying a second subset of matching candidates from the set of biometric templates of the second biometric modality;
    receiving, at the biometric engine, a third biometric probe of a third biometric modality, wherein the third biometric modality is any biometric feature that can be digitally analyzed, and is different from the first and second biometric modality;
    comparing the third biometric probe against a set of biometric templates of the third biometric modality, wherein the set of biometric templates of the third biometric modality are limited to biometric templates of the third biometric modality associated with the identified second subset of matching candidates from the set of biometric templates of the second biometric modality; and
    identifying a third subset of matching candidates from the set of biometric templates of the third biometric modality.

3. The method of claim 1, further comprising the steps of storing the set of biometric templates of the first biometric modality in a first template data cache and storing the set of biometric templates of the second biometric modality in a second template data cache.

4. The method of claim 1, wherein the first biometric modality is different than the second biometric modality.

5. The method of claim 1, further comprising the step of determining the set of biometric templates of the first modality based on a demographic data search, wherein each of the set of biometric templates of the first modality is associated with demographic data.

6. The method of claim 1, further comprising the step of determining the set of biometric templates of the first modality based on a geographic data search, wherein each of the set of biometric templates of the first modality is associated with geographic data.

7. The method of claim 1, wherein the step of identifying a first subset of matching candidates from the set of biometric templates of the first biometric modality comprises the step of generating a biometric score for each of the set of biometric templates of the first biometric modality and determining whether the biometric score exceeds a predetermined threshold score.

8. The method of claim 7, wherein the step of identifying a second subset of matching candidates from the set of biometric templates of the second biometric modality comprises the step of generating a biometric score for each of the set of biometric templates of the second biometric modality and determining whether the biometric score exceeds a predetermined threshold score.

9. A multimodal biometric search method implemented on a biometric engine and comprising the steps of:
    receiving, at a biometric engine, a first biometric probe of a first biometric modality, a second biometric probe of a second biometric modality, and a third biometric probe of a third biometric modality, wherein the first biometric modality is any biometric feature that can be digitally analyzed, and the second and third biometric modalities are different from the first biometric modality;
    comparing the first biometric probe against a set of biometric templates of the first biometric modality; identifying a first subset of matching candidates from the set of biometric templates of the first biometric modality;
    comparing the second biometric probe against a set of biometric templates of the second biometric modality, wherein the set of biometric templates of the second biometric modality are associated with the set of biometric templates of the first biometric modality;

identifying a second subset of matching candidates from the set of biometric templates of the second biometric modality;

comparing the third biometric probe against a set of biometric templates of the third biometric modality, wherein the set of biometric templates of the third biometric modality are associated with the set of biometric templates of the first biometric modality;

identifying a third subset of matching candidates from the set of biometric templates of the third biometric modality; and identifying a unified set of matching candidates by joining the first subset, second subject, and third subset of matching candidates at intersection points.

10. The method of claim 9, wherein the steps of identifying a first subset of matching candidates from the set of biometric templates of the first biometric modality, identifying a second subset of matching candidates from the set of biometric templates of the second biometric modality, and identifying a third subset of matching candidates from the set of biometric templates of the third biometric modality are performed in parallel.

11. The method of claim 9, further comprising the steps of storing the set of biometric templates of the first biometric modality in a first template data cache, storing the set of biometric templates of the second biometric modality in a second template data cache, and storing the set of biometric templates of the third biometric modality in a third template data cache.

12. The method of claim 10, wherein the first, second, and third biometric modalities are different.

13. The method of claim 9, further comprising the step of determining the set of biometric templates of the first modality based on a demographic data search, wherein each of the set of biometric templates of the first modality is associated with demographic data.

14. The method of claim 9, further comprising the step of determining the set of biometric templates of the first modality based on a geographic data search, wherein each of the set of biometric templates of the first modality is associated with geographic data.

15. The method of claim 12, wherein the step of identifying a first subset of matching candidates from the set of biometric templates of the first biometric modality comprises the step of generating a biometric score for each of the set of biometric templates of the first biometric modality and determining whether the biometric score exceeds a predetermined threshold score.

16. The method of claim 15, wherein the step of identifying a second subset of matching candidates from the set of biometric templates of the second biometric modality comprises the step of generating a biometric score for each of the set of biometric templates of the second biometric modality and determining whether the biometric score exceeds a predetermined threshold score.

17. The method of claim 16, wherein the step of identifying a third subset of matching candidates from the set of biometric templates of the third biometric modality comprises the step of generating a biometric score for each of the set of biometric templates of the third biometric modality and determining whether the biometric score exceeds a predetermined threshold score.

* * * * *